US011677293B2

(12) United States Patent
Lilley

(10) Patent No.: US 11,677,293 B2
(45) Date of Patent: Jun. 13, 2023

(54) ELECTRIC MOTOR CONVERSION SYSTEM

(71) Applicant: Honda Motor Co., Ltd., Tokyo (JP)

(72) Inventor: Nicholas Lamar Lilley, Alpharetta, GA (US)

(73) Assignee: HONDA MOTOR CO., LTD., Tokyo (JP)

(*) Notice: Subject to any disclaimer, the term of this patent is extended or adjusted under 35 U.S.C. 154(b) by 186 days.

(21) Appl. No.: 17/159,851

(22) Filed: Jan. 27, 2021

(65) Prior Publication Data
US 2022/0239185 A1  Jul. 28, 2022

(51) Int. Cl.
B60K 1/00 (2006.01)
H02K 5/22 (2006.01)
F16M 7/00 (2006.01)
H02K 11/00 (2016.01)
B60L 3/00 (2019.01)
B60L 50/15 (2019.01)
E01C 19/40 (2006.01)

(52) U.S. Cl.
CPC ............. H02K 5/22 (2013.01); B60K 1/00 (2013.01); B60L 3/00 (2013.01); B60L 50/15 (2019.02); F16M 7/00 (2013.01); H02K 11/0094 (2013.01); E01C 19/40 (2013.01)

(58) Field of Classification Search
CPC ........ H02K 5/22; H02K 11/0094; B60K 1/00; B60L 3/00; B60L 50/15; F16M 7/00; E01C 19/40
See application file for complete search history.

(56) References Cited

U.S. PATENT DOCUMENTS

| 3,673,931 | A |   | 7/1972  | Dening et al. |
| 4,134,291 | A |   | 1/1979  | Gregoire |
| D311,859  | S | * | 11/1990 | Bohringer ...................... D8/380 |
| 5,174,539 | A | * | 12/1992 | Leonard ................. F16M 13/02 248/300 |
| 5,441,297 | A | * | 8/1995  | Krohn ....................... B62B 1/26 280/655 |

(Continued)

FOREIGN PATENT DOCUMENTS

| CN | 104786803 | 7/2015 |
| JP |   5208578 | 6/2013 |

(Continued)

Primary Examiner — Jacob B Meyer
(74) Attorney, Agent, or Firm — Rankin, Hill & Clark LLP

(57) ABSTRACT

An internal combustion engine to electric motor conversion system for a work machine is provided. The electric motor conversion system is sized to substantially conform to a footprint of the internal combustion engine on the work machine. The electric motor conversion system includes an electric motor, a power distribution unit and a connecting bracket. The electric motor is configured for direct mounting on a frame of the work machine. The power distribution unit is separate from and positioned atop the electric motor. The power distribution unit controls operation of the electric motor. The connecting bracket is separate from the electric motor and power distribution unit. The connecting bracket includes a base, first attachment elements extending from a lower surface of the base for attachment to the electric motor, and second attachment elements extending from an upper surface of the base for attachment to the power distribution unit.

18 Claims, 4 Drawing Sheets

(56) References Cited

U.S. PATENT DOCUMENTS

| | | | |
|---|---|---|---|
| 5,504,655 A | 4/1996 | Underwood et al. | |
| 6,435,359 B1* | 8/2002 | Priminano | A47F 7/28 |
| | | | 211/75 |
| 6,521,371 B1* | 2/2003 | Lavanture | H01M 50/20 |
| | | | 429/96 |
| 6,766,991 B1* | 7/2004 | Nance | F16M 7/00 |
| | | | 248/215 |
| 8,397,845 B2* | 3/2013 | Yoshida | B60K 6/405 |
| | | | 180/65.22 |
| 9,102,221 B1 | 8/2015 | Monfort et al. | |
| 9,316,343 B2 | 4/2016 | O'Hara | |
| 9,370,994 B2 | 7/2016 | Yokoyama et al. | |
| 9,849,791 B2* | 12/2017 | Suzuki | F16H 61/0006 |
| 2008/0149410 A1 | 6/2008 | Yang et al. | |
| 2017/0158042 A1* | 6/2017 | Miyazawa | B60L 1/02 |
| 2017/0197569 A1* | 7/2017 | Kabayama | H01M 50/249 |
| 2017/0232831 A1* | 8/2017 | Agata | B60K 6/54 |
| | | | 310/54 |
| 2017/0248268 A1* | 8/2017 | Copanas | F16M 5/00 |
| 2018/0138839 A1 | 5/2018 | Puzio et al. | |
| 2019/0238083 A1 | 8/2019 | White et al. | |
| 2020/0076270 A1 | 3/2020 | Murai | |
| 2020/0076337 A1 | 3/2020 | Abbott et al. | |
| 2022/0239185 A1* | 7/2022 | Lilley | B60L 3/00 |

FOREIGN PATENT DOCUMENTS

| | | |
|---|---|---|
| JP | 5390980 | 1/2014 |
| JP | 5664308 | 2/2015 |
| JP | 6595747 | 10/2019 |
| JP | 2019198208 | 11/2019 |
| KR | 1020200011712 | 2/2020 |
| WO | 2020183492 | 9/2020 |

* cited by examiner

ELECTRIC MOTOR CONVERSION SYSTEM

BACKGROUND

The configuration of electric motors and related power distribution units is different from typical internal combustion engines, which can prevent the replacement of an internal combustion engine and its related components included in power equipment with the combination electric motor/power distribution unit. Therefore, there is a need for a mounting system that attaches the electric motor to the power distribution unit in such a way that the combination electric motor/power distribution unit more closely resembles an operational footprint of an internal combustion engine in the power equipment, thereby allowing for the replacement of the internal combustion engine without impacting other operational components of the power equipment.

BRIEF DESCRIPTION

According to one aspect, an internal combustion engine to electric motor conversion system for an associated work machine is provided. The electric motor conversion system is sized to substantially conform to a footprint of the associated internal combustion engine on the associated work machine. The electric motor conversion system comprises an electric motor, a power distribution unit and a connecting bracket. The electric motor is configured for direct mounting on an associated frame of the associated work machine. The power distribution unit is separate from and positioned atop the electric motor. The power distribution unit controls operation of the electric motor. The connecting bracket is separate from the electric motor and power distribution unit. The connecting bracket includes a base, first attachment elements extending from a lower surface of the base for attachment to the electric motor, and second attachment elements extending from an upper surface of the base for attachment to the power distribution unit.

According to another aspect, an internal combustion engine to electric motor conversion system for an associated work machine is provided. The electric motor conversion system is sized to substantially conform to a footprint of the associated internal combustion engine on the associated work machine. The electric motor conversion system comprises an electric motor, a power distribution unit and a connecting bracket. The electric motor is configured for mounting on an associated frame of the associated work machine. The power distribution unit is separate from the electric motor for controlling operation of the electric motor. The connecting bracket is positioned between the electric motor and the power distribution unit. The bracket includes a base covering the electric motor, first attachment elements extended in a first direction from the base for attachment to the electric motor, and second attachment elements extended in a second opposite direction from the base for attachment to the power distribution unit.

According to another aspect, an internal combustion engine to electric motor conversion system for an associated work machine is provided. The electric motor conversion system is sized to substantially conform to a footprint of the associated internal combustion engine on the associated work machine. The electric motor conversion system includes an electric motor configured for mounting on an associated frame of the associated work machine, and a separate power distribution unit positioned atop the electric motor for controlling operation of the electric motor. The electric motor conversion system comprises a connecting bracket separate from the electric motor and power distribution unit. The connecting bracket includes a base positioned between the electric motor and the power distribution unit, first attachment elements extending from a lower surface of the base for direct attachment to the electric motor, and second attachment elements extending from an upper surface of the base for direct attachment to the power distribution unit.

DETAILED DESCRIPTION

Figure 1:
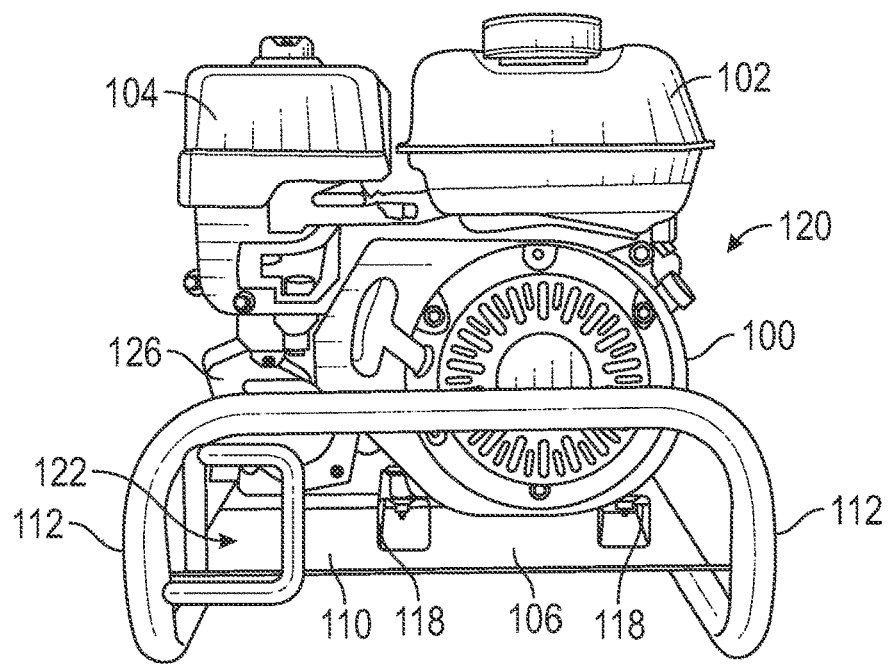
FIG. 1 is a perspective view of a known internal combustion engine mounted to a frame of a known working machine.

It should, of course, be understood that the description and drawings herein are merely illustrative and that various modifications and changes can be made in the structures disclosed without departing from the present disclosure. Referring now to the drawings, wherein like numerals refer to like parts throughout the several views, FIG. 1 illustrates a known arrangement of an internal combustion engine 100 (e.g., an engine operating on fuels such as gasoline, petrol, diesel, kerosene, bio-fuels or the like), together with a fuel tank 102, air cleaner 104 and muffler (not visible, located behind the air cleaner), mounted on a frame 106 of a work machine. By way of example, in FIG. 1 the frame 106 is part of a vibratory compactor as the work machine. However, it should be appreciated that the frame 106 can be part of other work machines operated by an internal combustion engine. The frame 106 for the work machine includes a base or platform 110 supported on frame rails 112. Mounts 118 for the internal combustion engine 100 are located on the platform 110, and the internal combustion engine is mounted to the frame mounts 118 such that a drive shaft (not visible) of the internal combustion engine 100 is oriented along a length direction of the frame 106. With the internal combustion engine 100, together with the fuel tank 102, the air cleaner 104 and the muffler, directly mounted to the frame 106, the internal combustion engine 100 defines an operational footprint or envelope 120 on the frame 106 shaped such that a component space 122 on the work machine for an operational component of the work machine, for example a drive shaft mount 126, is defined by the internal combustion engine 100 and its related components.

Figure 2:
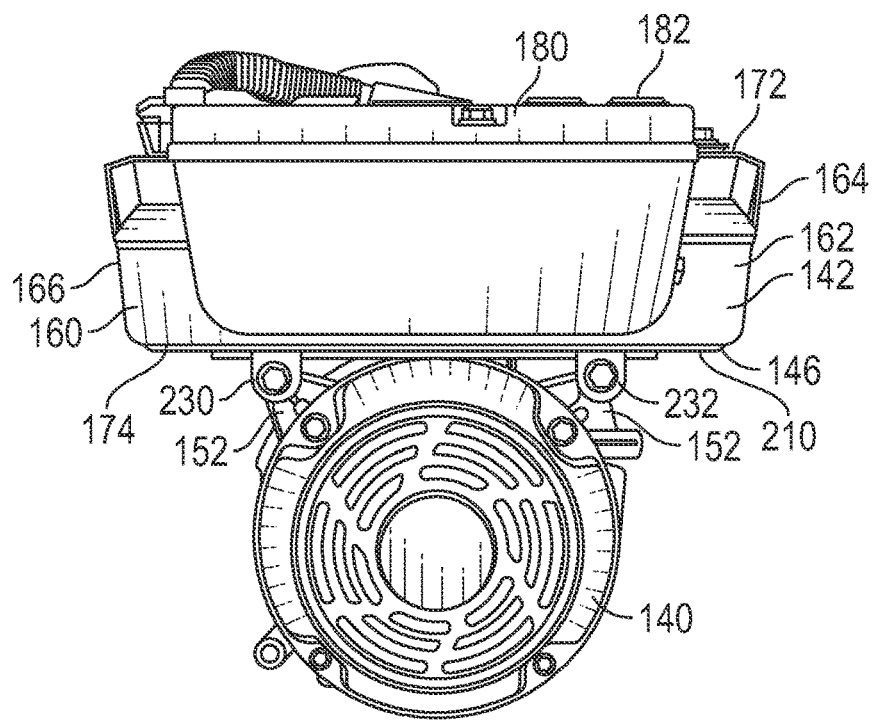
FIG. 2 is a perspective view of an exemplary electric motor conversion system including an electric motor, a power distribution unit and a connecting bracket.
Figure 3:
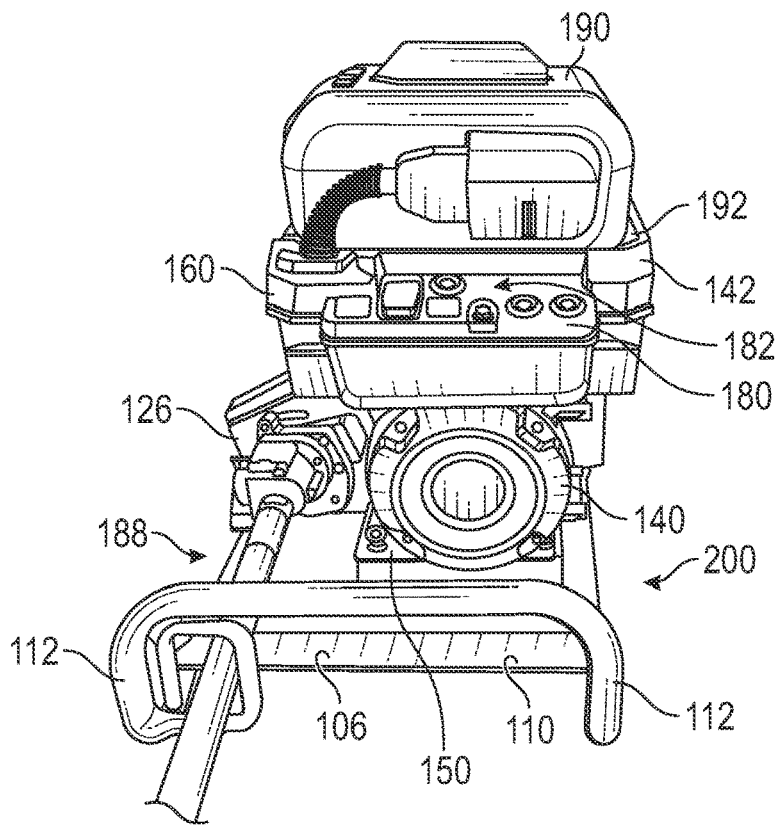
FIGS. 3 and 4 are perspective views of the electric motor conversion system mounted to the frame of the working machine of FIG. 1
Figure 4:
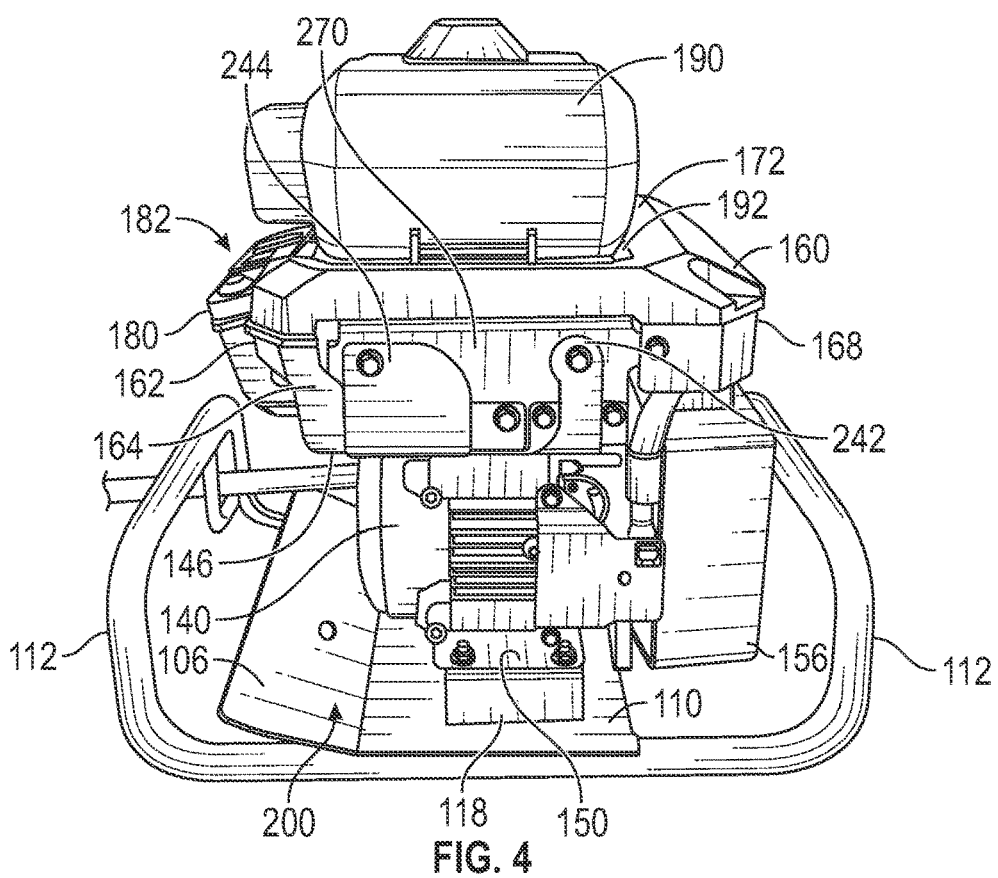
Figure 5:
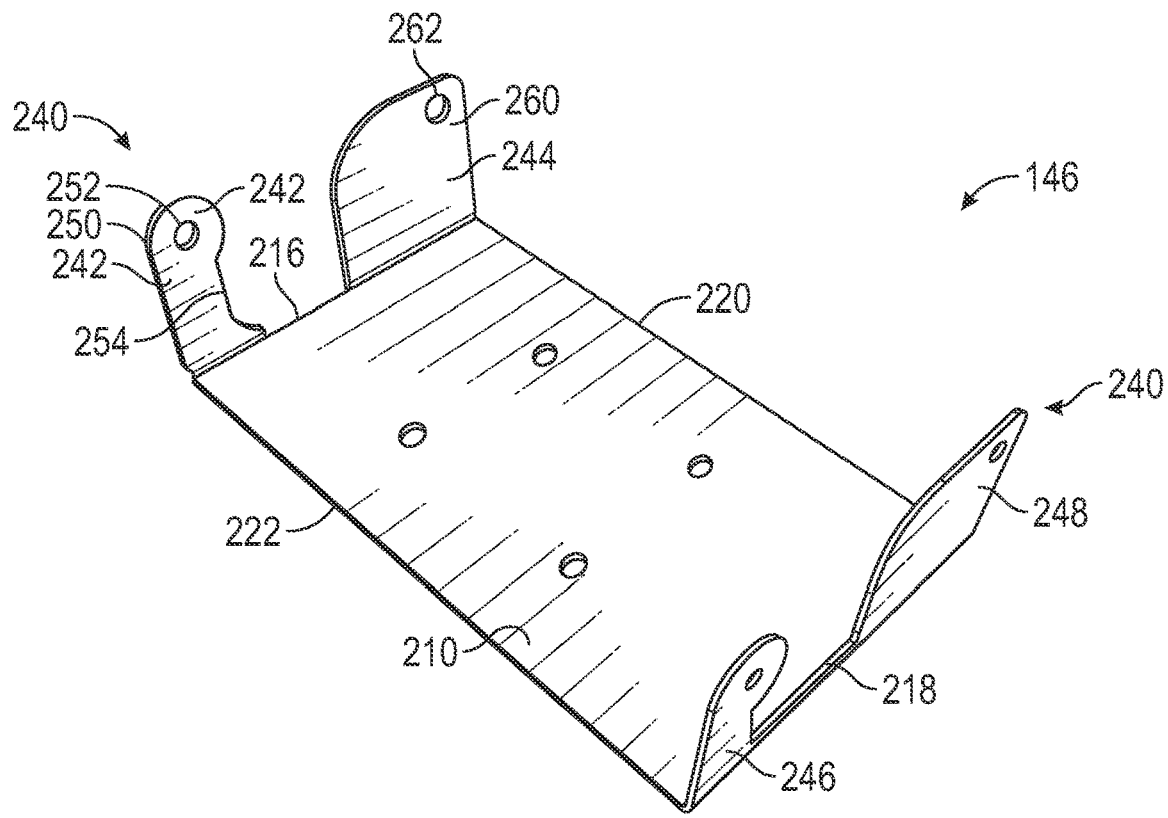
FIGS. 5, 6, 7 and 8 are various views of the connecting bracket of the electric motor conversion system.
Figure 6:
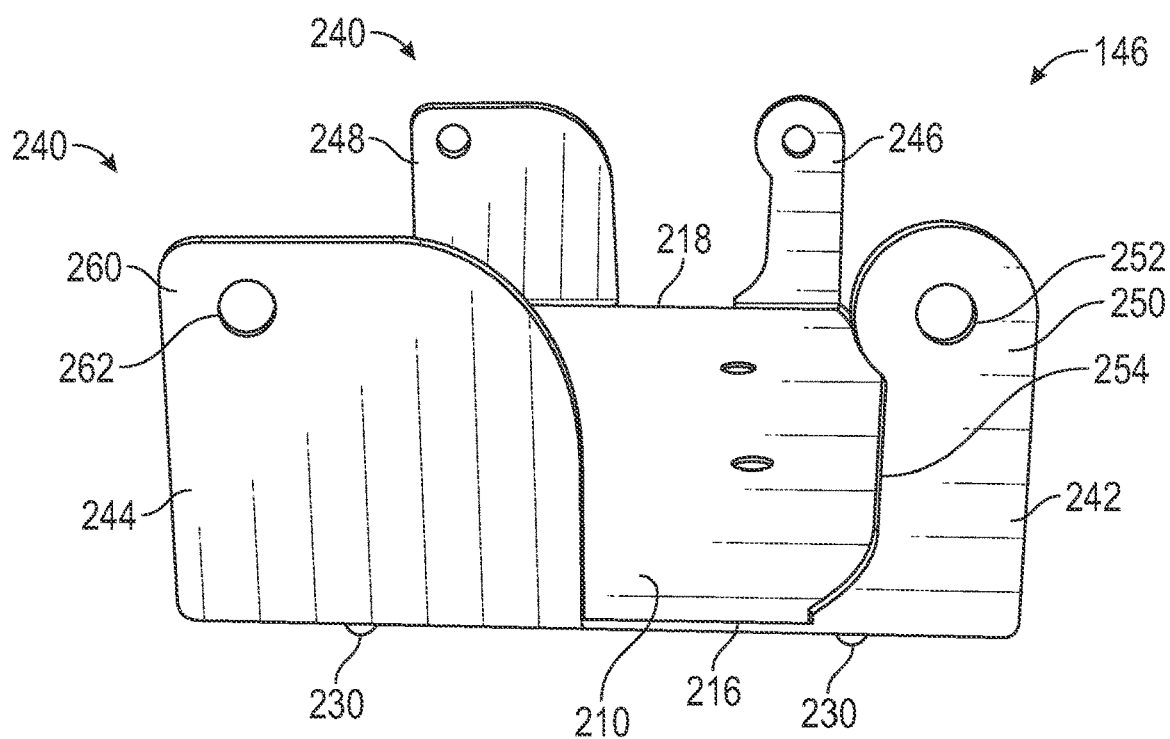
Figure 7:
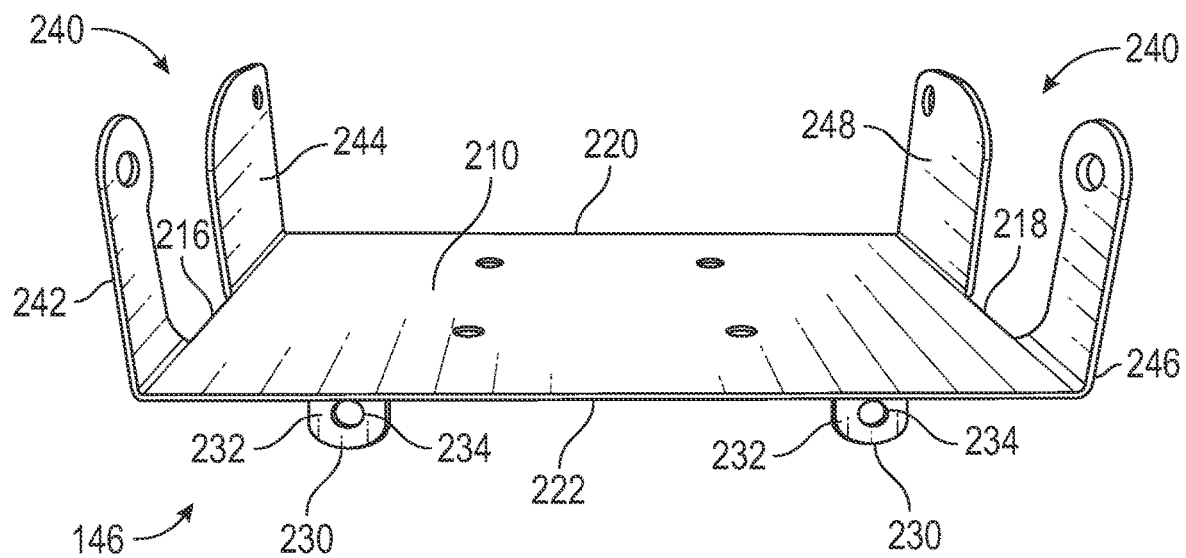
Figure 8:
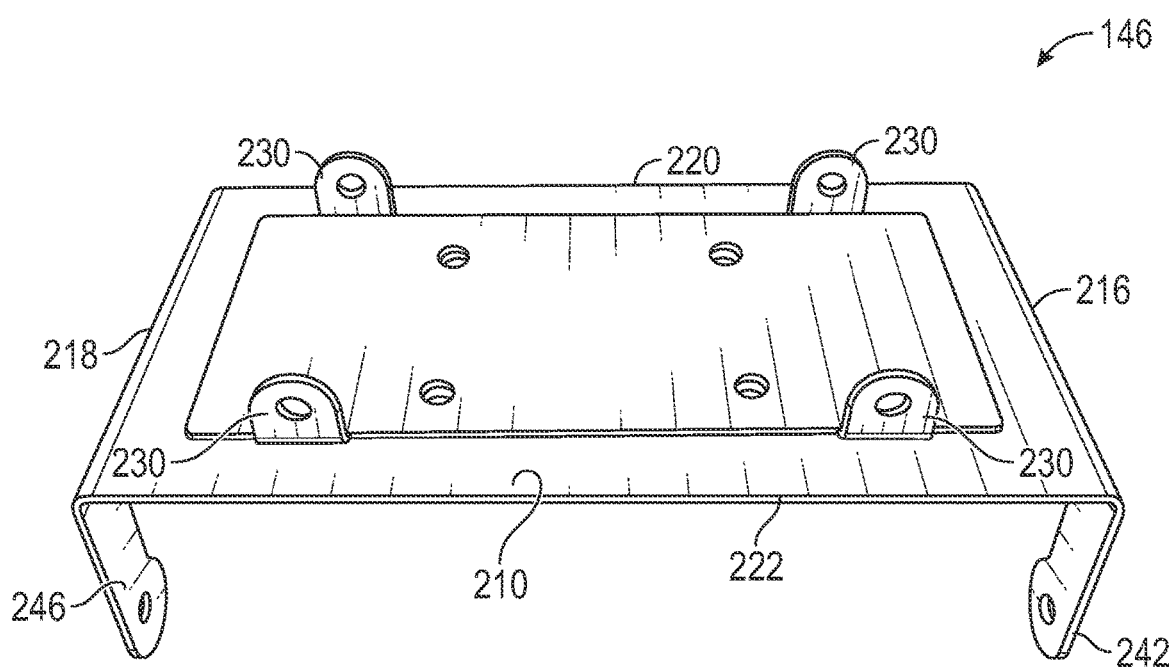

For certain operators of the work machine, there is a need for a conversion system to enable different prime movers, suitable for use with the work machine, to be mounted thereon. The present disclosure provides an internal combustion engine to electric motor conversion system for the work machine that is sized to substantially conform to and resemble the operational footprint 120 of the internal combustion engine 100 on the frame 106 of the work machine, thereby allowing for the replacement of the internal combustion engine 100. With reference to FIGS. 2-4, the exemplary electric motor conversion system comprises an electric motor 140, a power distribution unit 142 for controlling operation of the electric motor, and a connecting bracket 146 for connecting the electric motor 140 and the power distribution unit 142. It should be appreciated that the electric motor can be a DC motor or an AC motor and is selected to have a maximum power output substantially matching that of the internal combustion engine 100. By way of example, the internal combustion engine 100 for use with the vibratory compactor is a 6-10 HP rated engine, requiring the 2-3 KW rated electric motor.

In the depicted aspect, the electric motor 140 is provided with lower mounting features or brackets 150 adapted for direct attachment to the mounts 118 on the frame platform 110, and is further provided with upper mounting features or brackets 152 adapted for attachment to the connecting bracket 146. Similar to the internal combustion engine 100, when directly mounted to the frame 106 via the mounts 118 the electric motor 140 is oriented with its output shaft (not visible) along a length direction of the frame 106. The output shaft can be operably coupled to a drive unit 156. The power distribution unit 142 is separate from and mounted atop the electric motor 140. As shown, the power distribution unit 142 includes a generally rectangular shaped housing 160 with sidewalls 162, 164, 166, 168, a top wall 172 and a bottom wall 174. A control panel 180 extended from the sidewall 162 is configured to include controls 182 (shown in FIG. 3) for controlling power delivery to the electric motor 140. The housing 160 is dimensioned such that the electric motor 140 is confined within an outermost perimeter of the power distribution unit 142 defined by the sidewalls.

By having these components of the electric motor conversion system appropriately sized and rated, the electric motor 140 and the power distribution unit 142 together define a component space 188 on the work machine that positionally matches the component space 122 on the work machine defined by the internal combustion engine 100. Therefore, the existing operational components of the work machine provided on the frame 106 are not impacted by the replacement of the internal combustion engine 100. The exemplary electric motor conversion system further comprises a battery (or battery receptacle for one or more batteries) 190 separate from and positioned within a seat 192 defined in the housing top wall 172 of the power distribution unit 142. The battery 190 is also confined within the outermost perimeter of the power distribution unit 142 to provide a compact configuration. Accordingly, the electric motor 140, the power distribution unit 142, the drive unit 156 and the battery 190 are arranged and configured so that an overall operational footprint or envelope 200 of the electric motor conversion system is substantially similar to the operational footprint 120 of the internal combustion engine 100 that the electric motor conversion system is intended to replace.

The connecting bracket 146, which is a separate component of the electric motor conversion system, is best depicted in FIGS. 5-8. The connecting bracket 146 includes a base 210 to be positioned between the electric motor 140 and the power distribution unit 142. The base 210 is shaped and dimensioned to cover the electric motor 140 when connected thereto and to be confined within the outermost perimeter of the power distribution unit 142. The base 210 which can be rectangular shaped in top plan view includes a lower surface 212 (i.e., the surface facing the electric motor 140), an upper surface 214 (i.e., the surface facing the power distribution unit 142), and side edges 216, 218, 220, 222. The lower surface 212 of the base extends parallel to the upper surface 214, and first attachment elements 230 extend from the lower surface 212 of the base 210 for attachment to the electric motor 140. In the depicted aspect, the first attachment elements 230 are positioned inwardly from a perimeter edge—as defined by the side edges 216, 218, 220, 222—of the base 210 and are configured as tabs 232 with openings 234. The tabs 232 extends approximately perpendicularly from the lower surface 212 and are sized so that the openings 234 align with openings (not visible) on the upper brackets 152 of the electric motor 140. Fasteners secure the upper brackets 152 to the tabs 232. Once mounted to the electric motor 140, the side edges 216, 218 extend along a length dimension of the electric motor and the side edges 220, 222 extend along a width dimension of the electric motor.

The connecting bracket 146 further includes second attachment elements 240 extending from the upper surface 214 of the base 210 for attachment to the power distribution unit 142. As shown in FIGS. 5-8, the second attachment elements are in the form of mounting arms that extend from the side edges 216, 218 of the base 210, the mounting arms configured based on corresponding structures provided on the power distribution unit 142. In the exemplary embodiment, the mounting arms are defined by a first pair of mounting arms 242, 244 extended from the side edge 216 of the base and a second pair of mounting arms 246, 248 extended from the opposite side edge 218 of the base. The mounting arm 242 extends along the side edge 216 a predetermined length from an intersection of the side edges 216, 222. The mounting arm 242 includes an end portion 250 with an opening 252, and a recessed area 254 can be formed in the mounting arm 242 facing the mounting arm 244. The mounting arm 244 extends along the side edge 216 a predetermined length from an intersection of the side edges 216, 220. The mounting arm 244 includes an end portion 260 with an opening 262. Each of the mounting arms 242, 244 are shaped to limit vibration transmission from the electric motor 140 to the power distribution unit 142. More particularly, the end portion 250 of the mounting arm 242 is arcuate shaped, and corner sections of the end portion 260 of the mounting arm 244 are curved. Therefore, by having the end portions 250, 266 devoid of sharp corners, vibration transmission via the mounting arms is limited. In the depicted aspect, the mounting arms 246, 248 are shaped similar to the respective mounting arms 242, 244. In assembly, the mounting arms defining the second attachment elements 240 are mounted via fasteners within recessed areas (only recessed area 270 in sidewall 164 is shown in FIG. 4 with the mounting arms 242, 244 mounted therein) of the power distribution unit 142. It should be appreciated that be having the second attachment elements 240 mounted within the recessed areas, the size of the power distribution unit 142 in a width direction remains substantially the same.

Accordingly, as is evident from the foregoing, the connecting bracket 146 of the exemplary electric motor conversion system attaches the electric motor 140 to the separate power distribution unit 142 in such a way that the operational footprint 200 of the combination 140, 142 more closely resembles the operational footprint 120 of the internal combustion engine 100 and its related components on the frame 106 of the work machine.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An internal combustion engine to electric motor conversion system for an associated work machine, the electric motor conversion system sized to substantially conform to a footprint an associated internal combustion engine on the associated work machine, the electric motor conversion system comprising:
   an electric motor configured for direct mounting on an associated frame of the associated work machine;
   a power distribution unit separate from and positioned atop the electric motor, the power distribution unit controlling operation of the electric motor; and
   a connecting bracket separate from the electric motor and power distribution unit, the connecting bracket including a base, first attachment elements extending from a lower surface of the base for attachment to the electric motor, and second attachment elements extending from an upper surface of the base for attachment to the power distribution unit.

2. The system of claim 1, wherein the base is positioned between the electric motor and the power distribution unit and is sized to be confined within an outermost perimeter of the power distribution unit.

3. The system of claim 1, wherein the lower surface of the base extends parallel to the upper surface of the base.

4. The system of claim 1, wherein the first attachment elements are positioned inwardly from a perimeter edge of the base.

5. The system of claim 1, wherein the second attachment elements are defined by mounting arms that extend from first and second opposite side edges of the base.

6. The system of claim 5, wherein the second attachment elements include a first pair of mounting arms extended from the first side edge of the base and a second pair of mounting arms extended from the opposite second side edge of the base.

7. The system of claim 6, wherein the first and second side edges extend along a length dimension of the electric motor.

8. The system of claim 5, wherein each of the mounting arms is shaped to limit vibration transmission from the electric motor to the power distribution unit.

9. The system of claim 1, wherein the second attachment elements are mounted within a recessed area of the power distribution unit.

10. The system of claim 1, wherein the electric motor and the power distribution unit together define a component space on the associated work machine that positionally matches an associated component space on the associated work machine defined by the associated internal combustion engine.

11. The system of claim 1, including a battery separate from and positioned within a seat defined atop the power distribution unit, wherein the battery is confined within an outermost perimeter of the power distribution unit.

12. An internal combustion engine to electric motor conversion system for an associated work machine, the electric motor conversion system sized to substantially conform to a footprint of an associated internal combustion engine on the associated work machine, the electric motor conversion system comprising:
   an electric motor configured for mounting on an associated frame of the associated work machine;
   a power distribution unit separate from the electric motor for controlling operation of the electric motor; and
   a connecting bracket positioned between the electric motor and the power distribution unit, the bracket including a base covering the electric motor, first attachment elements extended in a first direction from the base for attachment to the electric motor, and second attachment elements extended in a second opposite direction from the base for attachment to the power distribution unit.

13. The system of claim 12, wherein the first attachment elements extend from a lower surface of the base, and the second attachment elements extend from an upper surface of the base.

14. The system of claim 12, wherein the base is sized to be confined within an outermost perimeter of the power distribution unit.

15. The system of claim 12, wherein the second attachment elements are defined by mounting arms that extend from first and second opposite side edges of the base.

16. The system of claim 15, wherein the second attachment elements include a first pair of mounting arms extended from the first side edge and a second pair of mounting arms extended from the opposite second side edge.

17. The system of claim 12, including a battery separate from and positioned within a seat defined atop the power distribution unit, wherein the battery is confined within an outermost perimeter of the power distribution unit.

18. An internal combustion engine to electric motor conversion system for an associated work machine, the electric motor conversion system sized to substantially conform to a footprint of an associated internal combustion engine on the associated work machine, the electric motor conversion system including an electric motor configured for mounting on an associated frame of the associated work machine, and a separate power distribution unit positioned atop the electric motor for controlling operation of the electric motor, the electric motor conversion system comprising:
   a connecting bracket separate from the electric motor and power distribution unit, the connecting bracket including a base positioned between the electric motor and the power distribution unit, first attachment elements extending from a lower surface of the base for direct attachment to the electric motor, and second attachment elements extending from an upper surface of the base for direct attachment to the power distribution unit,
   wherein the base includes first and second opposite side edges and third and fourth opposite side edges, the side edges defining a perimeter edge of the base,
   wherein the first attachment elements are positioned inwardly from the perimeter edge of the base,
   wherein the second attachment elements include a first pair of spaced mounting arms extended from the first side edge of the base and a second pair of spaced mounting arms extended from the opposite second side edge of the base,
   wherein one mounting arm of the first pair of mounting arms extends along the first side edge from an intersection of the first and third side edges and includes a recessed area facing the other mounting arm of the first pair of mounting arms, the other mounting arm extends along the first side edge from an intersection of the first and fourth side edges,
   wherein the second pair of mounting arms are configured the same as the first pair of mounting arms.

* * * * *